United States Patent [19]
Voll

[11] 3,840,116
[45] Oct. 8, 1974

[54] MOLDING APPARATUS HAVING FINISHED ARTICLE DISCHARGE WITH IMPROVED SCRAP SEPARATOR

[75] Inventor: Gordon R. Voll, Beloit, Wis.

[73] Assignee: Beloit Corporation, Beloit, Wis.

[22] Filed: Nov. 20, 1972

[21] Appl. No.: 307,770

[52] U.S. Cl. .............................................. 209/99
[51] Int. Cl. ............................................ B07b 1/12
[58] Field of Search ........................... 309/97, 98, 99

[56] References Cited
UNITED STATES PATENTS

| 24,155 | 5/1859 | Snell | 209/99 X |
|---|---|---|---|
| 495,945 | 4/1893 | McDonough | 209/99 X |
| 2,501,403 | 3/1950 | McKinsey | 209/99 X |
| 2,549,316 | 4/1951 | Kremer | 209/99 |
| 3,211,289 | 10/1965 | Brumagin | 209/99 |
| 3,447,680 | 6/1969 | Mehnert | 209/98 X |
| 3,701,418 | 10/1972 | Chapman | 209/99 |
| 3,704,780 | 12/1972 | Aidlin | 209/99 X |

*Primary Examiner*—Richard A. Schacher
*Attorney, Agent, or Firm*—Larson, Taylor and Hinds

[57] ABSTRACT

In a molding apparatus, an arrangement for receiving both scrap pieces and the finished articles and for separating them from each other for delivery to their respective collection areas. An open support surface formed, for example, as a plurality of spaced rods, extends from the mold toward the collecting area, preferably downwardly inclined, the openings therethrough being of such a size as to prevent the larger of the scrap pieces or finished articles from passing therethrough while permitting the smaller of the scrap pieces or finished articles to pass therethrough and into a collecting receptacle. Meanwhile, the larger of the scrap pieces or finished articles move along the support surface into another collecting receptacle.

15 Claims, 4 Drawing Figures

MOLDING APPARATUS HAVING FINISHED ARTICLE DISCHARGE WITH IMPROVED SCRAP SEPARATOR

BACKGROUND OF THE INVENTION

This invention relates to molding, and in particular to the separation of finished articles from scrap made during the molding process.

In any type of molding process, scrap pieces are formed along with the finished articles. For example, in either the cold or the hot parison blow molding technique, an end of the parison which is cut off by the closing blow mold halves becomes scrap which must be discarded. In blow molding discs, as described in commonly owned U.S. Pat. No. 3,661,489, which is incorporated by reference herein, scraps of various types may be formed. In injection molding, scrap pieces may take many forms, a more common type being the "runner" which is what remains of a large generally flat sheet after a plurality of "articles" have been punched out of the sheet. In some cases, for example blow molding parisons, the finished article is normally larger than the scrap piece while in other cases such as injection molding, at least the "runner" scrap piece is normally larger than the finished articles. But in any case, the common problem exists of separating from each other scrap pieces of one size and finished articles of a different size.

For simplicity and convenience, rather than describe all of the various molding techniques, the present invention will describe the invention specifically with respect to cold parison blow molding. However it will be understood that the invention is applicable to the various other types of molding procedures as described above such as hot parison blow molding, disc blow molding, injection molding, vacuum forming, etc.

In the cold parison blow molding technique, an initially cool parison is heated, transferred to a blow mold, and then formed into a finished article at the blow mold. A cold parison blow molding method and apparatus is described in copending commonly-owned U.S. application Ser. No. 276,071, filed July 28, 1972 now U.S. Pat. No. 3,765,813, which is a continuation of U.S. application Ser. No. 3,003, filed Jan. 15, 1970, which application is incorporated herein by reference.

Although numerous different types of materials may be used, for convenience, this specification will refer specifically to polypropylene.

Said commonly owned U.S. Pat. No. 3,765,813 discloses and claims a new and improved apparatus for heating and blow molding parisons into articles by the cold parison blow molding technique. In the method and apparatus as disclosed and claimed in said application, the cold parisons were first heated in an oven and then transferred by a suitable transfer arm directly from the oven to a blow molding station whereat the bottom of the parison was grasped, the parison was stretched, and the blow mold halves closed onto the parison which was then formed into a finished article in the closed blow mold. As disclosed and claimed in said Patent, the finished articles were discharged from the blow mold by a suction air stream which pulled the finished container upwardly into a discharge tube. While this proved satisfactory, it was found to have several disadvantages.

Consequently, an improved finished article discharge arrangement was developed, as disclosed and claimed in the commonly owned U.S. Application of Lawrence A. Moore Ser. No. 281,302, filed Aug. 17, 1972. In this latter arrangement, after the article has been formed and the mold halves separated, a force such as an air stream is exerted laterally against the side of the finished article urging the same off of the base and onto a downwardly inclined ramp into a trough. In this case, the transfer arm drops the scrap parison piece directly onto the ramp and it moves into the trough with the finished article. The trough is constructed to dispose of scrap material through an adjustable size slot located in the bottom thereof and concurrently permit finished articles to be conveyed away through an opening in the end thereof, into a suction tube.

However, this finished article discharge arrangement has been found to suffer from the disadvantage that it does not adequately separate the scrap pieces from the finished articles. As the finished articles and the scrap pieces fell together into the trough, the scrap pieces would tend to move with the finished articles through the finished article discharge tube. For example, some scrap pieces would adhere to the finished articles and hence be carried away therewith. Other scrap pieces, owing to their natural resiliency, would fall into the trough and literally bounce toward the finished article vacuum tube opening and hence be drawn thereinto with the finished articles.

Thus, there exists a need in a molding apparatus of an improved finished article discharge arrangement which more effectively separates the finished articles from the scrap pieces.

SUMMARY OF THE INVENTION

Thus, it is a purpose of the present invention to provide in a molding apparatus a finished article discharge arrangement having new and improved means for separating finished articles and scrap pieces from each other.

This purpose is achieved by providing along an article discharge path, an open support surface, the openings being large enough to permit the smaller of the finished articles or scrap pieces to fall therethrough while preventing the larger of the finished articles or scrap pieces from falling therethrough. Preferably, the open structure would comprise rods extending in the direction of travel of the finished articles and scrap pieces, and preferably also downwardly inclined in the said direction of travel. Consequently, as the finished articles and scrap pieces move along the support surface as they are being discharged from the mold, the larger items will continue to move along to one collection area and the smaller items will fall through the spaces between the rods to another collection area.

In the case of cold parison blow molding, the purpose of the present invention is achieved by providing, in an apparatus of the type as in application Ser. No. 281,302 wherein the parison scrap pieces are dropped onto the article discharge ramp, an arrangement in which separation of the finished articles from the parison scrap pieces takes place not merely at a common collecting receptacle or trough, but continuously along the downwardly inclined ramp. The finished articles and scrap pieces, thus separated, are then delivered separately to different collecting receptacles.

In accordance with a preferred embodiment, there is provided an article supporting surface leading away from the mold, the surface being of an open construction such that scrap pieces fall through the openings while the larger finished articles remain on the support surface for travel therealong to a finished article collecting area. Meanwhile, the scrap pieces, having fallen through the article support surface move along a separate, lower path to a scrap collecting area such as a scrap trough or the like.

A preferred arrangement may take the form of an inclined ramp similar to that disclosed in the said Moore application Ser. No. 281,302, wherein the open article support surface is constructed above the ramp and generally parallel therewith such that the finished articles move along the article support surface while the scrap pieces falls therethrough onto the ramp and into a trough. The article support surface may take the form of a plurality of rods, preferably extending in the direction of travel of the finished article, the rods being spaced apart from each other to provide the open structure. The rods can be constructed to have a spring-like resiliency so that as the finished articles travel therealong, they tend to bounce on and hence vibrate the rods, thus facilitating movement of the scrap pieces therethrough. In this arrangement, the rods could be fixed to the frame intermediate their ends, with the ends, especially the lower ends thereof, being free unconnected ends, thus permitting the vibrating movement of the rods. The rods would of course extend far enough to carry the finished articles over the scrap trough. In an alternative arrangement which is somewhat more sturdy, the lower ends of the rods can be fixed to the frame, for example fixed to the exit trough, and hence prevented from vibrating. In this case, the rods will still be arranged so as to carry the finished articles over the scrap trough.

Thus, it is a purpose of this invention to provide, a molded article discharge having a new and improved means for effectively separating finished articles from scrap pieces.

It is another object of this invention to provide, for use with a blow molding apparatus, a new and improved arrangement for discharging finished articles so as to separate scrap material therefrom.

It is another object of this invention to provide a molding appartus including a means for discharging finished articles therefrom such that scrap pieces are separated from the finished articles as the finished articles move from the mold to a receiving area.

It is another object of this invention to provide a new and improved molding apparatus of the type described in which finished articles move along an open article support surface while scrap pieces fall through this open surface to a lower ramp, the scrap pieces then falling into a trough while the finished articles pass along the article support surface over the trough to a separate finished article collecting area.

It is still another object of this invention to provide, for use with a molding apparatus, an improved finished article discharge arrangement having downwardly inclined ramp and an open structure having a plurality of spaced rods located over the ramp, whereby finished articles move down the open structure to a finished article collecting area and scrap pieces fall through the spaces between the rods and subsequently to a trough from which they are removed.

Other objects and the advantages of the invention will become apparent from the detailed description to follow, together with the accompanying drawings.

BRIEF DESCRIPTION OF THE DRAWINGS

There follows a detailed description of the preferred embodiments of the invention to be read together with the accompanying drawings.

DETAILED DESCRIPTION OF THE PREFERRED EMBODIMENTS

Figure 1:
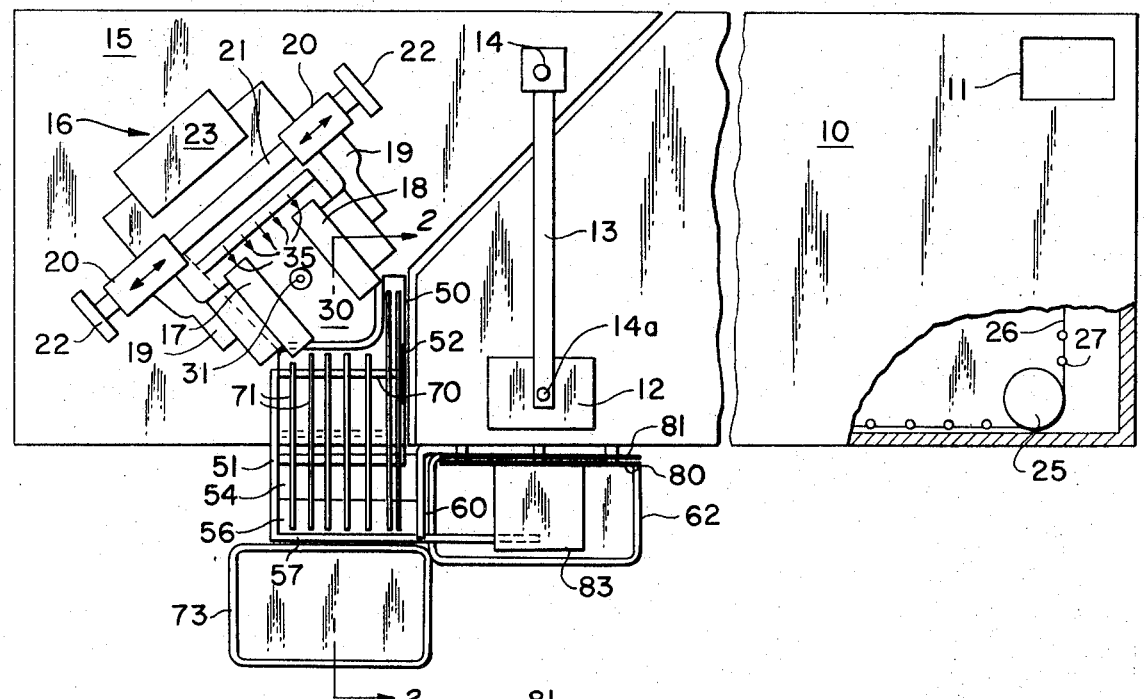
FIG. 1 is a plan view of a cold parison blow molding apparatus similar to that disclosed and claimed in said earlier application Ser. No. 276,071 but modified to include the discharge arrangement of the present invention with the new and improved scrap separating means.

Referring now to the drawings, like numerals represent like elements throughout the several views.

FIG. 1 illustrates schematically a parison heating oven 10. The details of this oven including the means for loading parisons into the oven and discharging parisons from the oven as well as the details of the transfer arm and the mold station are described in detail in said U.S. Pat. No. 3,765,813. Therefore, said U.S. Pat. No. 3,765,813 is incorporated herein by reference for such details. As shown schematically in FIG. 1, the oven 10 includes a parison loading station 11 at which parisons are loaded into the oven. In the oven there is provided an endless chain 26, a portion of which is visible in FIG. 1, which carries a plurality of parisons 27, some of which are visible in FIG. 1, along an endless path back and forth through the oven while the parisons are being heated. Finally, the properly heated parisons arrive at discharge station 12. At this point, a transfer arm 13 which is movable vertically and also about axis 14 moves down into the oven whereat a gripper means 14a, the top of which is shown in FIG. 1, grasps the heated parison. The transfer arm is then raised vertically after which the arm is rotated about axis 14 to carry the parison immediately over the plug 31 centered between the mold halves. At this point, the parison is lowered and gripped by means to be described immediately below.

The mold station 16 is illustrated schematically in FIG. 1. A base 30 has an opening in the center thereof through which the plug 31 moves upwardly to receive the bottom of the tubular parison. A pair of mold halves 17 and 18 move over the base towards each other to close onto the parison and away from each other to a separated, open position which is shown in FIG. 1. The mold halves are connected to brackets 19 which are in turn fixed to support blocks 20 which ride along rails 21 in the direction of the arrows, these rails 21 being fixed at their ends to fixed frame members 22. Suitable means are provided for moving the blocks 20 towards and away from each other to close and open the mold. This actuating means is shown schematically in FIG. 1 as element 23. In practice, this actuating means can take any form, for example the rotary actuating means shown in said U.S. Pat. No. 3,765,813, or the fluid operated clamping device shown in commonly owned U.S. application Ser. No. 228,048, filed Feb. 22, 1972.

The operation of the mold is explained in U.S. Pat. No. 765,813 and also in the said copending application Ser. No. 281,302. For purposes of understanding the present invention, however, it will simply be noted that the parison to be formed into the finished article is placed over the air hole and parison support plug 31 which projects upwardly from the surface of mold base 30 between the mold halves 17 and 18. After the parison has been blow molded into the finished article and the mold halves 17 and 18 separated from each other, the finished article will be in an inverted position directly over plug 31. At this time means indicated diagramatically by arrows 35 exert a lateral force on the finished article urging it onto the article discharge arrangement. In a preferred arrangement, as described in application Ser. No. 281,302, the means 35 would constitute air jets blowing the finished article generally horizontally out from between the separated mold halves 17 and 18. During the molding procedure, small scrap pieces are formed during the molding operation and when the mold halves separate, these fall onto the surface of the base 30. The means 35 would then also urge these scrap pieces off of the base 30 and onto the discharge arrangement. Also, as the transfer arm 13 swings back to the oven, it releases the upper scrap piece which drops onto the article discharge arrangement.

Figure 2:
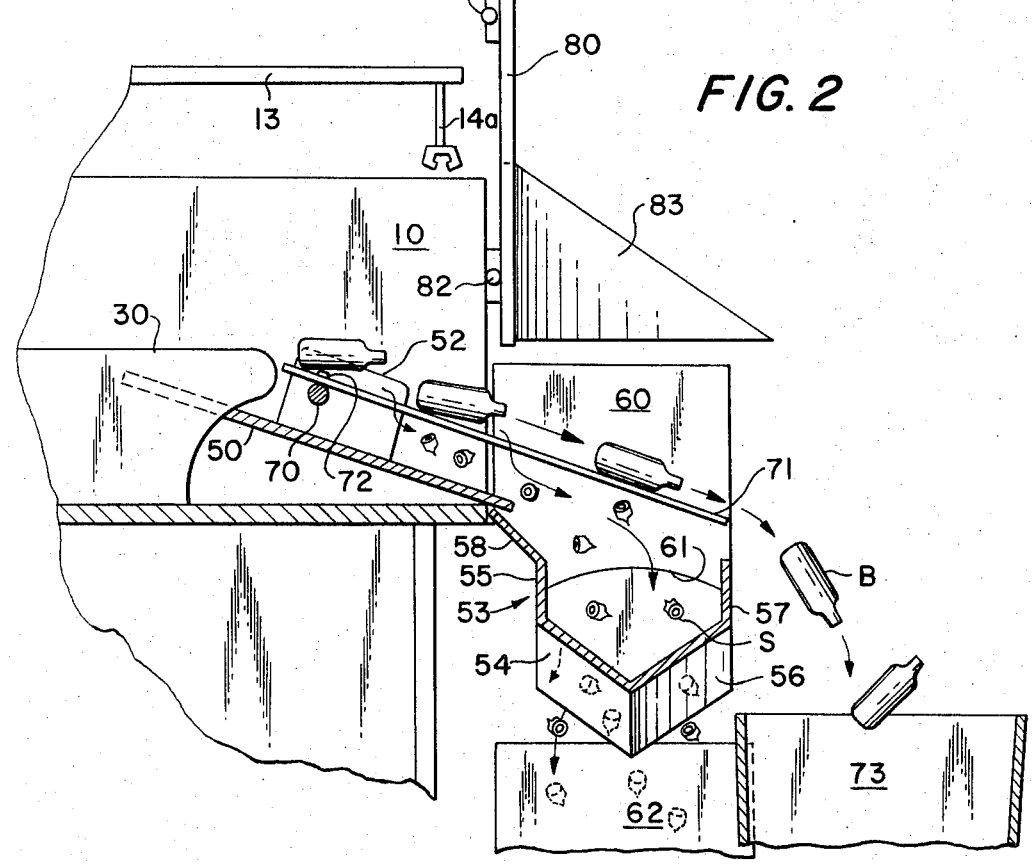
FIG. 2 is a cross-sectional view taken along line 2—2 of FIG. 1.
Figure 3:
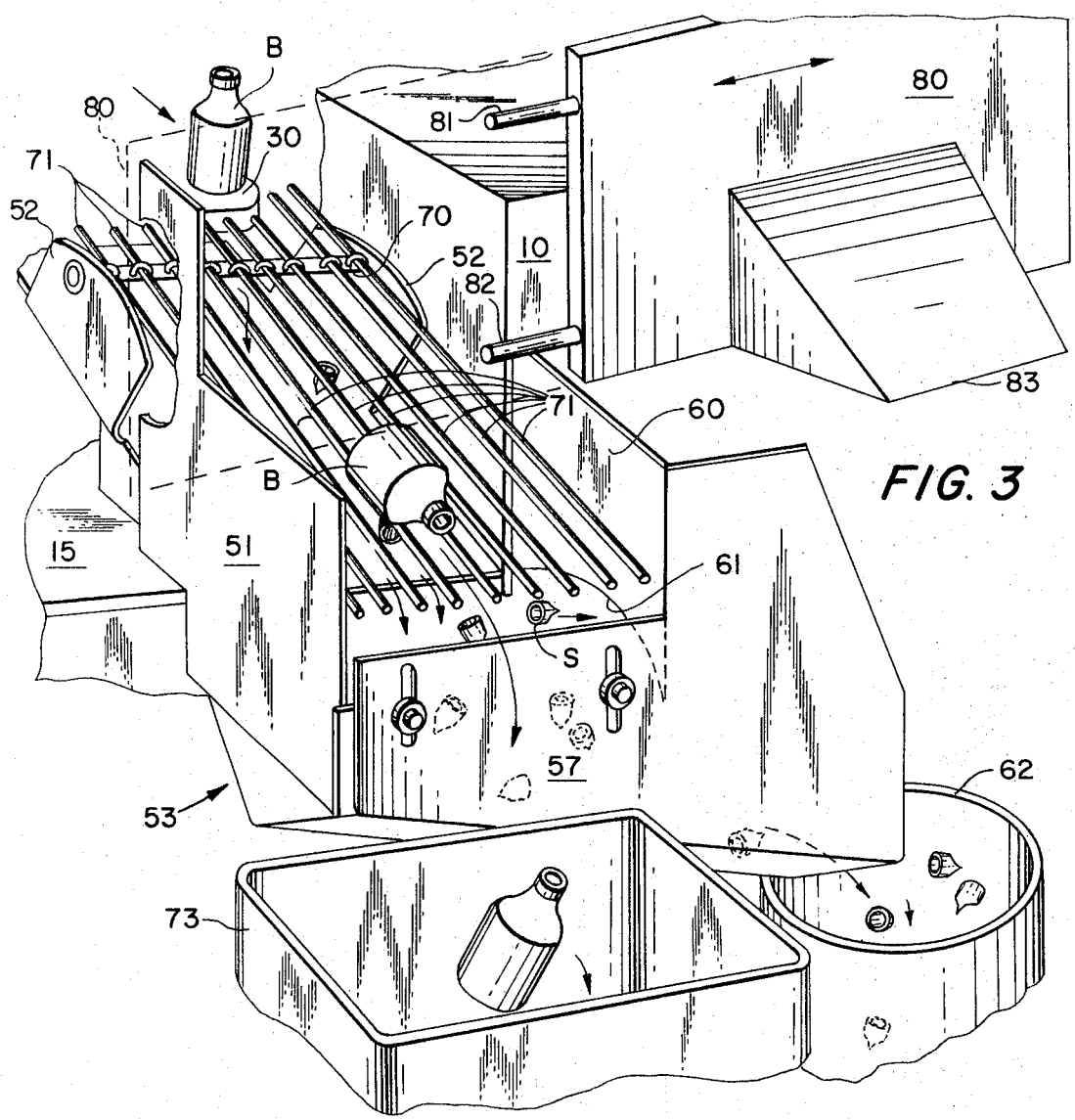
FIG. 3 is a perspective view of the scrap separating arrangement of FIGS. 1 and 2.

Referring to FIGS. 1-3, the discharge arrangement includes an imperforate ramp 50 fixed in place such that its upper end is adjacent the edge of base 30. On the left side thereof (as viewed in FIGS. 1 and 3) there is a raised side wall 51. A large side wall is not needed on the other side of ramp 50 since the side of oven 10 facing the ramp provides the necessary bordering surface. However, there is provided on this side a small side wall 52. A relatively stiff bar 70 extends across the ramp 50 spaced above it and connected at its ends to the side walls 51 and 52. Fixedly mounted on the bar 50 are a plurality of rods 71 having a much smaller diameter than the bar 70, these rods being connected by means 72 such as bolts or the like to the bar 70. These rods 71 together form an open article support structure, the upper ends of the rods being adjacent and slightly beneath the surface of base 30.

At the lower end of ramp 50 there is provided a trough 53 including a first inside sloped bottom portion 54 which at its upper end intersects side wall 55, which in turn at its upper end is formed into a flanged lip 58 which projects beneath the lower edge of ramp 50. The other sloped bottom wall 56 of the trough extends upwardly to meet an outside wall 57. The lefthand end of trough 53 (as viewed in FIG. 1) is closed by an outward extension of the wall 51. The righthand end of trough 53 (as viewed in FIG. 1) is closed by an end wall 60 which has an opening 61 through which the scrap pieces exit from the trough. As is evident from the figures, the rods 71 extend downwardly a sufficient amount such that the finished articles passing therealong pass over the outside wall 57 of the trough so that they can fall into an article reception means such as receptacle 73. The scrap which falls through opening 61 falls into the scrap receptacle 62.

Figure 4:
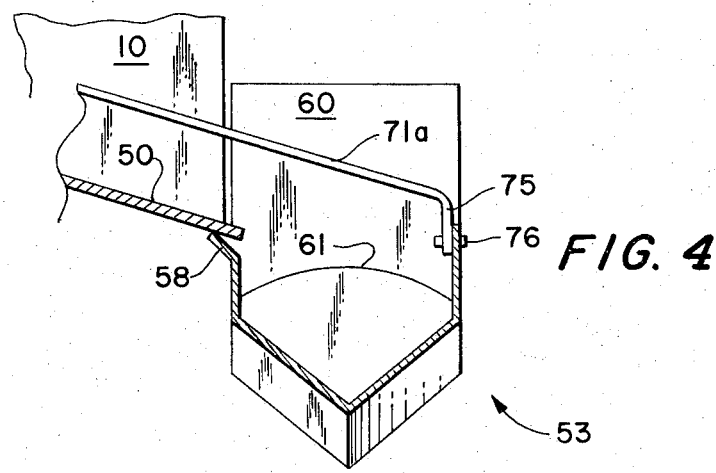
FIG. 4 is a partial cross-sectional view also taken along line 2—2 of FIG. 1, but showing a modification of the invention.

FIG. 4 illustrates a modification of the invention. The embodiment of FIG. 4 is exactly the same as the embodiment of FIGS. 1-3 in every respect except that the rods, which are referred to here as 71a, instead of being completely unconnected at their lower ends as in the embodiment of FIGS. 1-3, are bent at their lower ends as shown at 75, and these bent ends 75 are fixed by suitable means such as bolts 76, as shown schematically in the drawings, to the outside wall 57.

The invention operates as follows. After the article has been blow molded and the mold halves 17 and 18 have separated from each other, means 35 urge the finished article off of the plug 31 and onto the open article support surface formed by the rods 71 or 71a. This means 35 also clears the base 30 by blowing small pieces of scrap material and the like, onto the article support surface whereupon the small scrap pieces fall between the rods and onto the ramp 50. The larger upper parison scrap pieces are dropped onto the ramp and these also are separated from the finished articles by falling between the rods and onto the ramp 50. The finished articles B will travel off of the end of the rods and into the finished article collecting receptacle 73. Meanwhile, the pieces of scrap S which have fallen onto ramp 50 will fall into the trough 53, out through the opening 61 and into the scrap receptacle 62.

In practice, the pieces of scrap will often tend to adhere to the finished articles. The present invention therefore has the advantage that separation occurs not at a single point but throughout an extended area, namely along the complete length of the open article support surface formed by the rods from the upper ends thereof to the lower ends thereof adjacent wall 57.

In the embodiment of FIGS. 1-3, the rods 71 are connected only at the bar 70, the lower ends thereof being free unconnected ends. With this arrangement, as the articles B fall onto the rods and move therealong, they tend to bounce thereon, thus vibrating the rods 71, which rods are free to vibrate because of their cantilever connection only at the bar 70. This vibrating motion further facilitates separation of the scrap from the articles for movement of the scrap through the spaces between the rod 71. In the embodiment of FIG. 4, the rods 71a, in addition to being connected to the bar 70, are also fixed at their lower ends to the wall 57. These rods are essentially identical in operation to the rod 71 except that they will not vibrate. However, they have the advantage of being more sturdy since they are fixed at their lower ends.

Although not explicitly shown in previous applications relating to the present type of apparatus, there has been included in this type of apparatus a safety door which is movable to cover the area adjacent the mold halves, and the apparatus would not operate unless this door were in position to cover this area. The purpose for this door is of course to prevent one from accidentally placing his hands between the mold halves when the mold halves closed against each other. In the present invention, such a door is shown at 80. The door is slidable along rods 81 and 82 between an open position as shown in solid lines in FIG. 3 and a closed position, the outlines of which are shown in dotted lines in FIG. 3, at which closed position the bottom of the door is located just above the ramp 50, passing over the side wall 51 and the end wall 60. However, if this safety door were used as in the past without modification, it would prevent proper operation of the finished article discharge device. That is, with the bottom of the door at the level as shown, the finished articles could not pass freely over the side wall 57 into the receptacle 73. On the other hand, if the bottom of the safety door were raised so as to permit free passage of the finished articles into the receptacle 73, there would be too much room for a person to place his hands into the mold area, thus defeating the purpose of the safety door. In view of this, the safety door has been modified in accordance with the present invention by providing thereon a safety shroud 83 which extends outwardly. The door itself is cut out where the safety shroud intersects it and the shroud extends over the trough 53 so as to permit the finished articles to pass over the wall 57 into the receptacle 73. It has been found that this safety shroud 83 has the additional advantage of directing the air from jets 35 downwardly into the trough 53, thereby creating an air stream which further facilitates separation of the scrap pieces by assisting downward movement thereof.

Although the invention has been described in considerable detail with respect to preferred embodiments thereof, it will be apparent that the invention is capable of numerous modifications and variations apparent to those skilled in the art without departing from the spirit and scope of the invention.

I claim:

1. An apparatus comprising: a blow mold for blow molding preforms into finished articles, said blow mold including a base and mold halves relatively movable over said base such that in the opened position of the mold, the finished articles produced in the mold are located at a mold area on the base between the open mold halves, a means for defining a path for movement of the finished articles away from the said mold area, and a separating means for separating scrap from the finished articles as the finished articles travel along said path, said separating means including a downwardly inclined article support surface formed by a plurality of spaced apart elongated generally parallel rods extending in a direction along said path and downwardly inclined in the direction of travel of said path, the upper end of the article support surface being located directly adjacent the blow mold such that finished articles and scrap can move from the said mold area directly onto the upper end of the article support surface, the spaces between the rods being large enough to permit scrap pieces to fall between the rods while concurrently small enough to prevent finished articles from falling between the rods, the downward inclination of the article support surface being great enough for the said finished articles to move downwardly therealong under the influence of gravity, and including means at the blow mold for exerting a force across the base acting on both the finished articles and any scrap at the blow mold area for moving said articles and scrap in a generally horizontal direction out of the said blow mold area and onto the upper end of the article support surface.

2. The invention of claim 1, including a ramp beneath the rods and inclined downwardly away from the mold, scrap receiving means for receiving the scrap which moves down the ramp, said rods extending out over the scrap receiving means to deliver the finished articles to a separate finished article receiver.

3. The invention of claim 2, said scrap receiving means being a trough located at the lower end of the ramp, an opening in the trough for the passage therethrough of scrap pieces to a scrap receiver, said rods extending over the trough.

4. The invention of claim 3, said rods being of a spring consistency and having free unconnected lower ends, wherein as the finished articles move along the rods, they vibrate the rods to assist movement of scrap pieces through the openings.

5. The invention of claim 4, including a bar extending across the ramp, said rods being connected in cantilevered fashion to the bar, which cantilever connection provides said spring effect.

6. The invention of claim 3, said rods being fixed at their lower ends to the side of the trough farthest from the ramp.

7. The invention of claim 3, said trough being downwardly inclined and having an opening in the end wall thereof for the passage therethrough of the scrap pieces.

8. The invention of claim 1, said rods being resiliently mounted to vibrate as the finished articles pass thereover to facilitate the separation of small scrap pieces therethrough.

9. The invention of claim 1, said rods being fixed at their ends remote from the mold.

10. The invention of claim 1, including a trough positioned to receive the scrap pieces for delivery to a scrap receiver, the article support surface passing over the trough to deliver the finished articles to a separate finished article receiver.

11. The invention of claim 10, including a vertical door mounted to move into a position across the space just above the article support surface, said door adapted to prevent one from reaching into the area above the article support surface and into the area of the blow mold, said door including a shroud extending outwardly over the said trough thereby permitting free movement of the finished articles over the trough and into the finished article receptacle.

12. The invention according to claim 11 said ejecting means comprising air jets for blowing a stream of air laterally against the finished articles to blow them onto the support surface, and said shroud positioned to direct said stream of air downwardly into said trough to facilitate movement thereinto of scrap material.

13. An apparatus comprising: a blow mold for blow molding preforms into finished articles, a means for defining a path for movement of the finished articles away from the mold, and a separating means for separating scrap from the finished articles as the finished articles travel along said path, said separating means including a downwardly inclined article support surface formed by a plurality of spaced apart elongated generally parallel rods extending in a direction along said path and downwardly inclined in the direction of travel of said path, the upper end of the article support surface being located directly adjacent the blow mold such that finished articles and scrap can move from the blow mold directly onto the upper end of the article support surface, the spaces between the rods being large enough to permit scrap pieces to fall between the rods while concurrently small enough to prevent finished articles from falling between the rods, the downward inclination of the article support surface being great enough for the said finished articles to move downwardly therealong under the influence of gravity, a trough positioned to receive the scrap pieces for delivery to a scrap receiver, the article support surface passing over the trough to deliver the finished articles to a separate article receiver, a vertical door mounted to move into a position across the space just above the article support surface, said door adapted to prevent one from reaching into the area above the article support surface and into the area of the blow mold, said door including a shroud extending outwardly over said trough, thereby permitting free movement of the finished article over the trough and into the finished article receptacle, and including means for moving the finished articles away from the mold comprising air jets for blowing a stream of air laterally against the finished articles to blow them onto the support surface, and said shroud positioned to direct said stream of air downwardly into said trough to facilitate movement thereinto of scrap material.

14. An apparatus comprising: a blow mold for blow molding preforms into finished articles, leaving scrap preform pieces substantially smaller than the finished articles, a means for defining a path for movement of the finished articles away from the mold, and a separating means for separating said scrap pieces from the finished articles as the finished articles and the scrap pieces travel along said path, said separating means including a downwardly inclined article support surface formed by a plurality of spaced apart elongated generally parallel rods extending in a direction along said path and downwardly inclined in the direction of travel of said path, the upper end of the article support surface being located directly adjacent the blow mold such that finished articles and scrap pieces can move from the blow mold directly onto the upper end of the article support surface, the spaces between the rods being large enough to permit the scrap pieces to fall between the rods while concurrently small enough to prevent finished articles from falling between the rods, the downward inclination of the article support surface being great enough for the said finished articles to move downwardly therealong under the influence of gravity, said rods being of a spring consistency and having free unconnected ends wherein as the finished articles and the scrap pieces move therealong, the rods vibrate so as to assist separation of the scrap pieces through the openings.

15. The invention of claim 14, including a bar extending across the article support surface, said rods being connected in cantilevered fashion to the bar, which cantilevered fashion provides said spring effect.

* * * * *